United States Patent [19]

Matsutani

[11] Patent Number: 5,481,728
[45] Date of Patent: Jan. 2, 1996

[54] DATA PROCESSOR HAVING CIRCUITRY FOR HIGH SPEED CLEARING OF AN INTERRUPT VECTOR REGISTER CORRESPONDING TO A SELECTED INTERRUPT REQUEST

[75] Inventor: Takashi Matsutani, Itami, Japan

[73] Assignees: Mitsubishi Denki Kabushiki Kaisha; Mitsubishi Engineering Company Limited, both of Tokyo, Japan

[21] Appl. No.: 269,514

[22] Filed: Jul. 1, 1994

[30] Foreign Application Priority Data

Jul. 2, 1993 [JP] Japan .................... 5-164623

[51] Int. Cl.⁶ ............................... G06F 9/46; G06F 13/24
[52] U.S. Cl. .................... 395/293; 364/230.2; 364/280.8; 364/240; 364/240.5; 364/247; 364/DIG. 1; 395/868; 395/742
[58] Field of Search ............................... 395/325, 725, 395/775, 250, 275

[56] References Cited

U.S. PATENT DOCUMENTS

| | | | |
|---|---|---|---|
| 4,812,971 | 3/1089 | Butts, Jr. ............... | 395/375 |
| 4,991,086 | 2/1991 | Kojima ................... | 395/375 |
| 5,032,980 | 7/1991 | Ozaki et al. ............ | 395/375 |
| 5,129,067 | 7/1992 | Johnson ................. | 395/375 |
| 5,201,051 | 4/1993 | Koide ..................... | 395/725 |
| 5,287,523 | 2/1994 | Allison et al. .......... | 395/725 |
| 5,327,566 | 7/1994 | Forsyth .................. | 395/775 |

*Primary Examiner*—Gopal C. Ray
*Attorney, Agent, or Firm*—Lowe, Price, Leblanc & Becker

[57] ABSTRACT

Either the master address decode signal 4 generated by the master address decoder 3 or the reception interrupt factor vector decode signal 22 generated by the reception interrupt factor vector decoder 21 which decodes the reception interrupt factor vector 20, is select, ed by the decoder output select circuit 23 controlled by the interrupt vector register read signal 11, and the output from the decoder output select circuit 23 is given to each control register 5 as the multi function register select signal 24, and the AND signal of the multi function register select signal 24 obtained by the AND gate 110 and the interrupt vector register read signal 11, clears the interrupt request latch 6. During the time, by the interrupt vector register read signal 11, the bus cycle effective signal 9 to each control register 5 is masked.

3 Claims, 5 Drawing Sheets

DATA PROCESSOR HAVING CIRCUITRY FOR HIGH SPEED CLEARING OF AN INTERRUPT VECTOR REGISTER CORRESPONDING TO A SELECTED INTERRUPT REQUEST

BACKGROUND OF THE INVENTION

Field of the Invention

The present invention relates to a data processor having a plurality of registers, particularly to a data processor which is provided with an interrupt controller for controlling a plurality of interrupt factors with vectors, and operates simultaneously register contents specified by an address and a vector.

Description of Related Art

In a conventional data processor, being provided with an interrupt controller which manages a plurality of interrupt factors by vectors as well as has a control register for each factor, a daisy chain method for clearing an interrupt request flag of the interrupt factor after an interrupt request is received in an acknowledge cycle and a corresponding interrupt vector is read out is well known.

Figure 1:
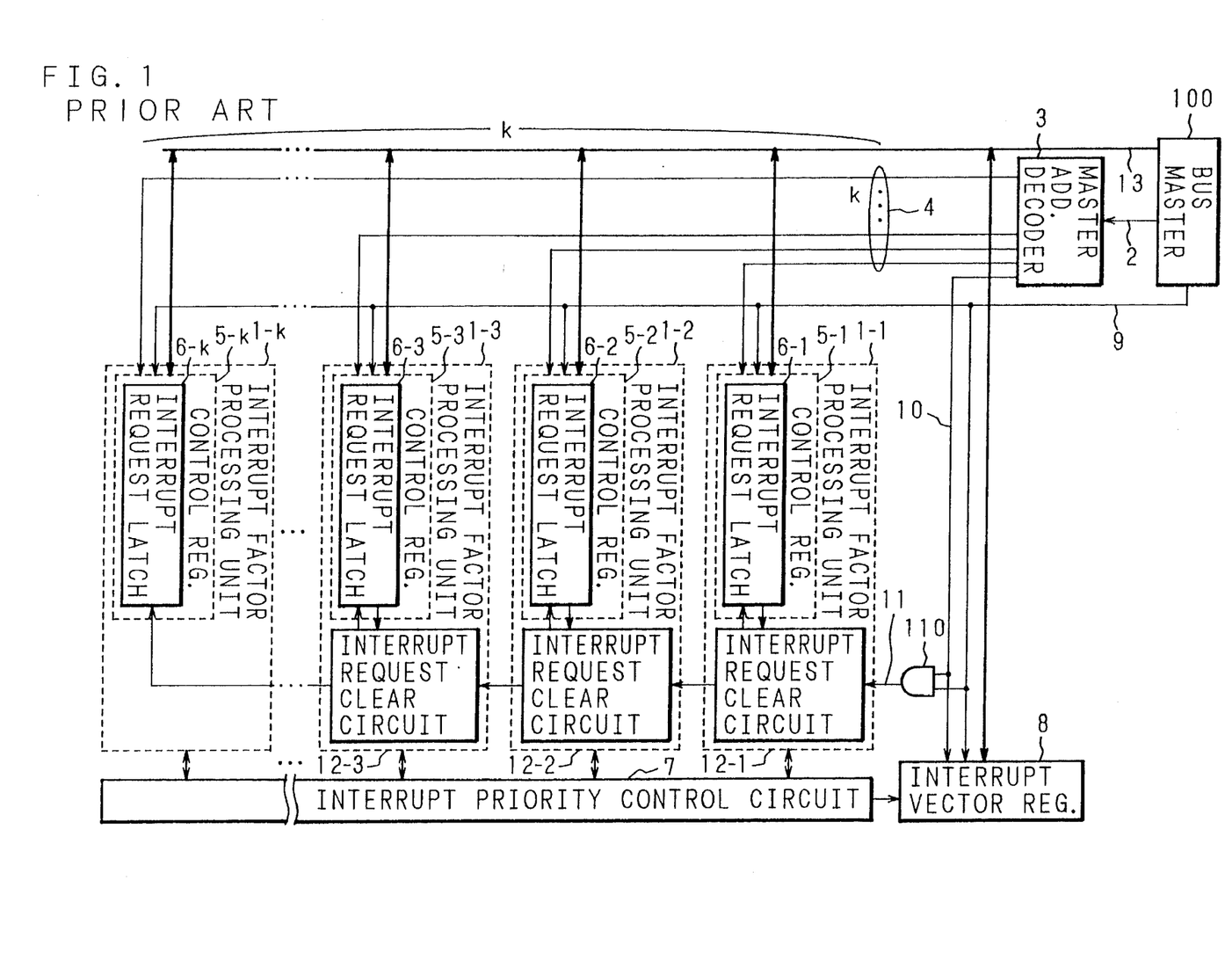
FIG. 1 is a block diagram showing a configuration example of a conventional interrupt controller which clears interrupt request flags by a daisy chain in a data processor.

FIG. 1 is a block diagram of a conventional interrupt controller adopting such the method. In FIG. 1, a part of an internal block of an interrupt controller having k number of interrupt factors is shown.

In FIG. 1 reference numeral 1 designates an interrupt factor processing unit, and k number of interrupt factor processing units designated by reference characters 1-1 to 1-k corresponding to k number of interrupt factors are provided.

To each interrupt factor processing unit 1, a unique interrupt vector is allocated, and a control register 5 and an interrupt request latch 6 for latching an interrupt request are provided. In addition, corresponding to the respective interrupt factor processing units 1-1 to 1-k, the respective control registers are designated by reference characters 5-1 to 5-k, and the respective interrupt request latches by 6-1 to 6-k.

Further, to the respective interrupt factor processing units 1 except the lowest interrupt factor processing unit 1-k, respective interrupt request clear circuits 12 are provided. Corresponding to the respective interrupt factor processing units 1-1 to 1-k-1, the respective interrupt request clear circuit 12 are designated by the reference characters 12-1 to 12-k-1.

Reference numeral 13 designates a data bus, which can input or output data between a bus master 100, for example, CPU or the like, and the respective control registers 5-1 to 5-k and an interrupt vector register 8 to be described later.

Numeral 3 designates a master address decoder, which generates address decode signal 4 designating the control register 5 of one or other interrupt factor processing unit by decoding a master address 2 outputted from the bus master 100.

Numeral 9 designates a bus cycle effective signal outputted from the bus master 100. When the signal 9 becomes in assertion state, inputting or outputting data between the control register 5 of the interrupt factor processing unit 1 specified by the address decode signal 4 and the data bus 13 is possible.

Accordingly, a read/write operation to each control register 5 by the bus master 100 is performed as follows.

By that the master address 2 outputted from the bus master 100 is decoded by the master address decoder 3, the address decode signal 4 which specifies one or other interrupt factor processing unit 1 is generated. When the bus cycle effective signal 9 is in assertion state, the read/write operation of data is performed between the control register 5 of the interrupt factor processing unit 1 specified by the address decode signal 4 and the bus master 100 through the data bus 13.

When an interrupt request is given from outside through a signal line (not shown), the interrupt request is latched to an interrupt request latch 6 of one or other interrupt Factor processing unit 1 corresponding to the inputted interrupt request. This state is called an interrupt request state.

Numeral 7 designates an interrupt priority control circuit, which judges whether or not the interrupt request is latched to the interrupt request latch 6 of each interrupt Factor processing unit 1. When the interrupt request is latched to one or other interrupt request latch 6, the interrupt priority control circuit 7 transfers an interrupt vector allocated to the interrupt factor processing unit 1 to the interrupt vector register 8 so as to latch the interrupt request. When the interrupt requests are latched to a plurality of interrupt request latches 6, the interrupt priority control circuit 7 transfers the interrupt vector allocated in the interrupt factor processing unit 1 having the highest priority among them to the interrupt vector register 8 so as to latch the interrupt vector.

Numeral 10 designates an interrupt vector register select signal, which is outputted from the bus master 100 when the bus master 100 selects the interrupt vector register 8 to read the interrupt vector latched by the interrupt vector register 8 so as to perform interrupt processing. In other words, when the interrupt processing is performed in such a way, it is necessary to clear the interrupt request which is the cause of the interrupt processing.

The interrupt vector register select signal 10 and the aforementioned bus cycle effective signal 9 are given to an AND gate 110 of 2 inputs. The output signal of the AND gate 110 is given to the interrupt request clear circuit 12 of the highest interrupt factor processing unit 1-1 as an interrupt vector register read signal 11. The interrupt request clear circuits 12-2 to 2-k-1 of the respective interrupt factor processing units 1 after the highest unit 1 are connected in daisy chain in order.

Thus, in the case where the bus cycle effective signal 9 is in assertion state, when the bus master 100 makes the interrupt vector select signal 10 be in assertion state in order to perform processing for the interrupt request, since the interrupt vector from the interrupt vector register 8 can be read out through the data bus 13, the bus master 100 performs the interrupt processing in accordance with the interrupt vector. At the same time, an interrupt vector register read signal 11 which is an output signal from the AND gate 110 becomes also in assertion state and is given to the interrupt request clear circuit 12-1 of the highest interrupt factor processing unit 1-1.

In the respective interrupt request clear circuits 12-1 to 12-k-1, the interrupt request clear circuit 12 of the interrupt factor processing unit 1 whose interrupt request is not received transmits to the interrupt request latch 6 of the interrupt factor processing unit 1 in the next stage that the interrupt vector register read signal 11 is effective. On the other hand, the interrupt request clear circuit 12 of the interrupt factor processing unit 1 whose interrupt request is received makes the interrupt vector register read signal 11 become ineffective as well as clears the request latch 6 of the interrupt factor processing unit in which the circuit 12 itself is included.

By that the respective interrupt request circuits 12 are operated in the way aforementioned, the interrupt vector register read signal 11 of in assertion state transmits through the respective interrupt request clear circuits 12 until the interrupt factor processing unit 1 whose interrupt request is received.

In the lowest, in other words, in the interrupt factor processing unit 1-k of the last stage, the interrupt request clear circuit 12 is not provided. But since the fact that the interrupt vector register read signal 11 of in the assertion state is transmitted until the interrupt factor processing unit 1-k means the case where the interrupt request of the interrupt factor processing unit 1-k of the last stage is received, therefore the interrupt request latch 6-k of the interrupt factor processing unit 1-k is necessarily cleared.

Since the interrupt controller of the conventional data processor is so configured as aforementioned, the delay time of the interrupt vector register read signal until the most end of the chain of the interrupt request clear circuit is the time of sum of the delay quantity of each interrupt factor processing unit. Therefore, when the number of the interrupt factor processing units is increased, the delay time of the interrupt vector register read signal until the most end of the chain of the interrupt request clear circuit becomes very long. Accordingly, in order to process a plurality of interrupt factors at high speed, such a method that the delay time of the interrupt vector register read signal does not depend upon the number of interrupt factors is required.

SUMMARY OF THE INVENTION

The present invention is devised in order to solve such problems as aforementioned, and the object thereof is to provide a data processor capable of clearing the interrupt request latch at high speed even when the number of interrupt factor processing units is increased.

The data processor of the invention comprises: a bus master for executing an interrupt processing in accordance with a corresponding interrupt vector when an interrupt: request is given from an external source; a group of registers consisting of a plurality of registers specified by a master address outputted from the bus master, and including a plurality of first kind of registers which latch respectively a plurality of interrupt requests and to which unique interrupt vectors are allocated corresponding to them respectively and other second kind of registers; a data bus connecting the bus master and each register of the group of registers: first decoding means for decoding a master address outputted From the bus master so as to output a decode signal which specifies one or other register of the group of registers: an interrupt vector register for latching, when an interrupt request is latched by one or a plurality of the plurality of first kind of registers, an interrupt vector corresponding to one of them; second decoding means for outputting a decode signal which specifies, by decoding an interrupt vector-latched by the interrupt vector register, the first kind of register corresponding to the interrupt vector; a decoder output select circuit for selecting the decode output of the second decoding means when the bus master reads an interrupt vector latched by the interrupt vector register so as to execute an interrupt processing, and for selecting the decode output of the first decoding means when the bus master accesses first kind or second kind of a register of the group of registers; and clearing means for clearing a first kind of register specified by the decode output of the decoder output select circuit, when the bus master reads an interrupt vector latched by the interrupt vector register so as to execute an interrupt processing.

In the data processor of the invention, either a select signal generated by decoding an address from the bus master or a select signal generated by decoding an interrupt factor processing vector, is selected by a select circuit controlled by a reception interrupt vector read signal so as to make it a register select signal, thereby, the interrupt request latch in the case where the interrupt processing is performed is cleared directly.

The above and further objects and features of the invention will more fully be apparent from the following detailed description with accompanying drawings.

DESCRIPTION OF THE PREFERRED EMBODIMENTS

In the following, explanation will be made on the invention referring to the drawings showing the embodiments thereof.

First Embodiment

Figure 2:
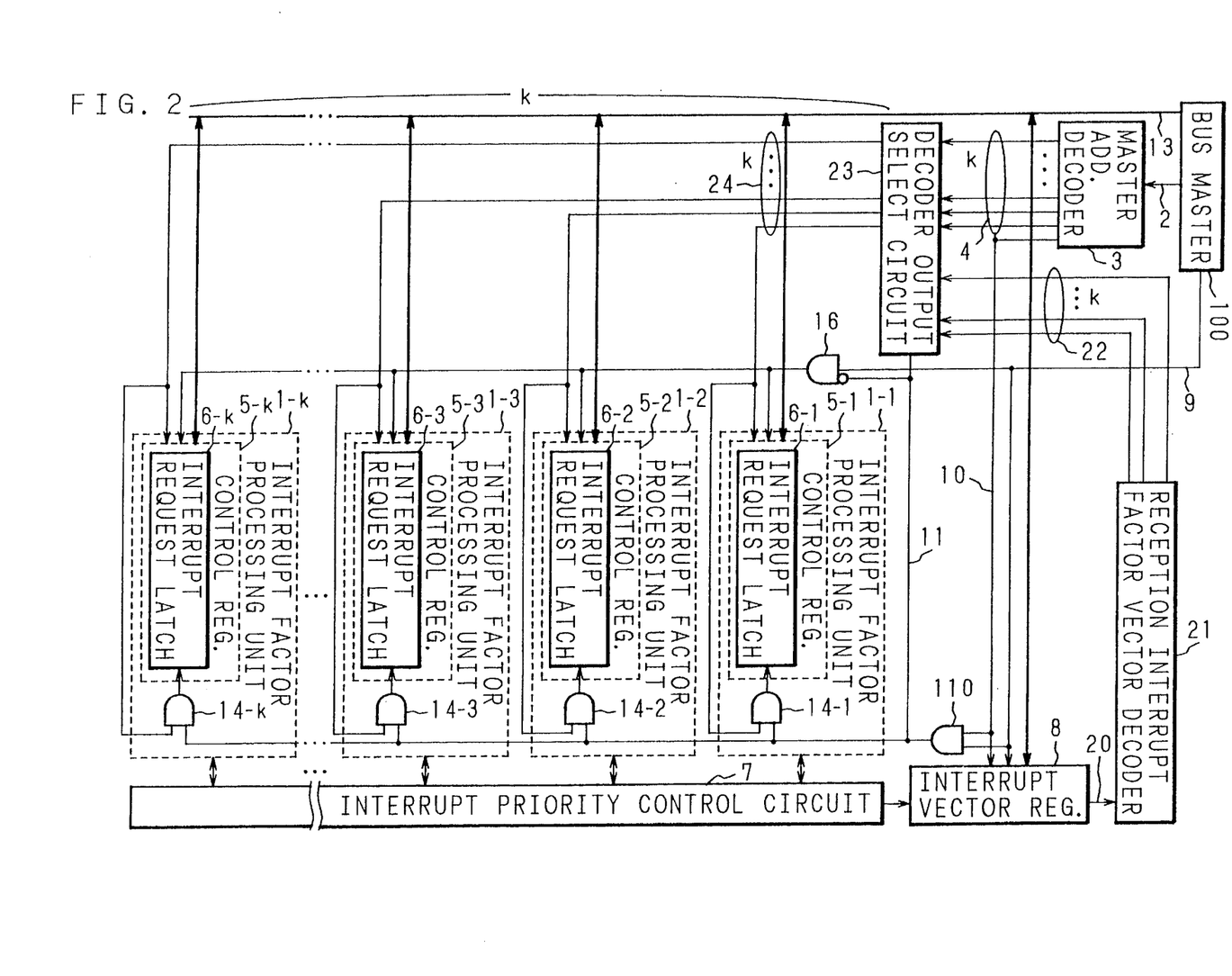
FIG. 2 is a block diagram showing a configuration example of an embodiment of an interrupt controller of a data processor of the invention.

FIG. 2 shows a part of an internal block of an interrupt controller having k number of the interrupt factors of one embodiment of the data processor of the invention.

In FIG. 2, the same reference characters as those FIG. 1 referred to by the explanation of the aforementioned conventional example show the same or corresponding parts.

In FIG. 2, reference numeral 1 designates an interrupt factor processing unit, and k number of the units designated by reference characters 1-1 to 1-k are provided corresponding to k number of interrupt factors.

To each interrupt factor processing unit 1, a unique interrupt vector is allocated as well as a control register and an interrupt request latch 6 which holds a interrupt request are provided. Corresponding to the respective interrupt factor processing units 1-1 to 1-k, the respective control registers are designated by characters 5-1 to 5-k, and the respective interrupt request latches by 6-1 to 6-k.

Further, each interrupt factor processing unit 1 is provided with an AND gate 14 of 2-input. Corresponding to the respective interrupt, factor processing units 1-1 to 1-k, the respective AND gates 14 are designated by reference characters 14-1 to 14-k-1.

Numeral 13 designates a data bus, which can input or output data between a bus master 100 such as CPU or the like and the respective control registers 5-1 to 5-k, and an interrupt vector register 8 to be described later.

Numeral 3 designates a master address decoder, which decodes a master address 2 outputted from the bus master 100 so as to generate an address decode signal 4 specifying the control register 5 of one or other interrupt factor processing unit 1.

In addition, in the conventional example shown in FIG. 1, the address decode signal 4 is given to each interrupt Factor processing unit 1 intact, however, in the first embodiment of the data processor of the invention, it is given to a decoder output select circuit 23 to be described later.

Numeral 9 designates a bus cycle effective signal outputted from the bus master 100. The bus cycle effective signal 9 is given to the interrupt vector register 8, one input terminal of an AND gate 110 of 2-input, and one input terminal of an AND gate 16 of 2-input. The other input terminal of the AND gate 16 is of negative logic, and the output signal of the AND gate 110 is given thereto.

To other input of the AND gate 110, an interrupt vector register select signal 10 is inputted. The interrupt vector register select signal 10 is outputted from the bus master 100 when the bus master 100 selects the interrupt vector register 8 to read the interrupt vector latched by the register 8 and performs the interrupt processing. In other words, when the interrupt processing is executed in such a way, the interrupt request which is the cause of the interrupt processing is necessary to be cleared.

The bus cycle effective signal 9 is given to the control register 5 of each interrupt factor processing unit 1 through the AND gate 16. When the signal 9 is in assertion state, data can be inputted or outputted between the control register 5 of the interrupt factor processing unit 1 specified by the address decode signal 4 and the data bus 13.

Numeral 21 designates reception interrupt factor vector decoder, in which a vector latched in the interrupt vector register 8 is given as a reception interrupt factor vector 20. The reception interrupt factor vector decoder 21 decodes the reception interrupt factor vector 20 and generates a reception interrupt factor processing vector decode signal 22 specifying the control register 5 of each interrupt factor processing unit 1, and gives the signal 22 to a decoder output select circuit 23.

The decoder output select circuit 23 selects, when the output signal of the AND gate 110 is in assertion state, the reception interrupt factor processing vector decode signal 22 which is the output signal of the reception interrupt Factor vector decoder 21, and selects, when the output signal of the AND gate 110 is in negation state, the address decode signal 4 which is the output signal of the master address decoder 3, and outputs selected signal as a multi function register select signal 24 respectively.

Accordingly, the read/write operation for each control register 5 by the bus master 100 is performed as follows.

By that the master address 2 outputted from the bus master 100 is decoded by the master address decoder 3, the address decode signal 4 specifying one or other interrupt Factor processing unit 1 is generated. When the bus cycle effective signal 9 is in assertion state and the interrupt vector register select signal 10 is in negation state, since the output signal of the AND gate 110 is in negation state, the output signal of the AND gate 16 becomes in assertion state and the decoder output select circuit 23 becomes in the state where the address decode signal 4 is selected.

By the facts aforementioned, since the bus cycle effective signal 9 of in assertion state is given from the bus master 100 to each control register 5 and the address decode signal 4 is given from the decoder output selector 23 to the control register 5 of each interrupt factor processing unit 1, the read/write operation of data becomes possible between the control register 5 of the interrupt factor processing unit 1 specified by the address decode signal 4 and the bus master 100 through the data bus 13.

When an interrupt request is given through a signal line (not shown), an interrupt request is latched to an interrupt latch 6 of one or other interrupt factor processing unit 1 corresponding to the inputted interrupt request. The state is called an interrupt request state.

Numeral 7 designates an interrupt priority control circuit, which judges whether or not an interrupt request is attached by the interrupt request latch 6 of each interrupt. Factor processing unit 1. When an interrupt request is latched by one or other interrupt request latch 6, the interrupt priority control circuit 7 transfers an interrupt vector allocated to the interrupt factor processing unit, 1 to the interrupt vector register 8 so as to latch the vector. When a plurality of interrupt requests are latched by a plurality of interrupt request latches 6, the interrupt priority control circuit 7 transfers an interrupt vector allocated to the interrupt request processing unit 1 of the highest priority among the units 1 to the interrupt vector register 8 so as to latch the vector.

The interrupt vector latched by the interrupt vector register 8 is further transferred by the reception interrupt Factor vector decoder 21 as the reception interrupt factor vector 20 so as to be decoded. As a result, it is detected that to which interrupt factor processing unit 1 the interrupt vector latched by the interrupt vector register 8 is allocated, and the signal specifying the interrupt factor processing unit 1 is outputted to the decoder output select circuit 23 as the reception interrupt factor processing vector decode signal 22.

In addition, the fact that the interrupt vector register select signal 10 and the aforementioned bus cycle effective signal 9 are given to the AND gate 110 of 2-input is same as that in the conventional example. But in the data processor of the invention, the output signal of the AND gate 110 is given to the AND gate 14 of each interrupt factor processing unit 1 as an interrupt vector register read signal 11, as well as to the input terminal of negative logic of the aforementioned AND gate 16 and to the decoder output select circuit 23.

Accordingly, in the case where the bus cycle effective signal 9 is in assertion state, when the bus master 100 asserts interrupt vector register select signal 10 in order to execute an interrupt request, the interrupt vector register read signal 11 outputted from the AND gate 110 also is in assertion state and is given to the AND gate 14 of each interrupt factor processing unit 1.

On the other hand, when the interrupt vector register read signal 11 becomes in assertion state, the decoder output select circuit 23 becomes in the state where it selects and outputs the reception interrupt factor processing vector decode signal 22 outputted from the reception interrupt factor vector decoder 21. And the output signal of the AND gate 16 becomes in negation state, in other words, in the state where it masks the bus cycle effective signal 9, and the bus cycle effective signal 9 being given to the control register 5 of each interrupt factor processing unit 1 becomes ineffective.

By the fact that the reception interrupt factor processing vector decode signal 22 is outputted from the decoder output select circuit 23 as the multi function register select signal 24, since the two input signals of the AND gate 14 of the interrupt factor processing unit 1 which is specified by the reception interrupt factor processing vector decode signal 22 become in assertion state, the control register 5 of the corresponding interrupt factor processing unit 1 is cleared.

As aforementioned, according to the first embodiment, when the bus master 100 accesses the interrupt vector register 8 in order to execute an interrupt processing, by that the interrupt factor processing unit 1 which has received an interrupt request is directly specified by the multi function register select signal 24 outputted from the decoder output select circuit 23, the interrupt request latch 6 can be cleared. Therefore, without increasing the area to be occupied by the control lines, the influence of the delay time necessary for clearing the interrupt request latch 6 accompanied by the increase of the number of interrupt factors can be suppressed.

Second Embodiment

Next, explanation will be made on second embodiment of the interrupt controller of the data processor of the invention.

Figure 3:
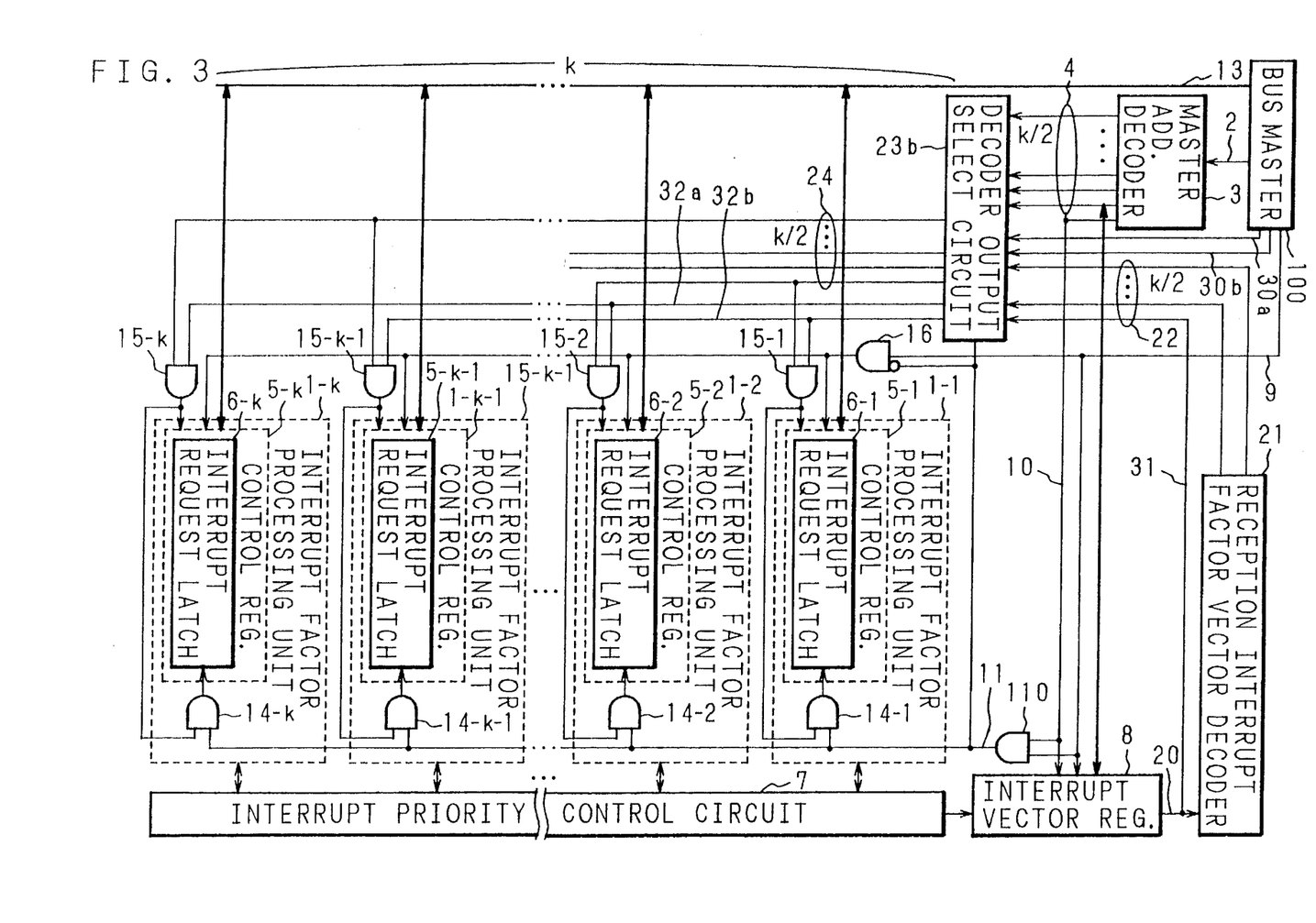
FIG. 3 is a block diagram showing a configuration example of another embodiment of an interrupt controller of a data processor of the invention.

In the second embodiment, in addition to the aforementioned first embodiment, the data bus 13 is of 16 bits (2 bytes) width, and the control registers 5 are allocated to the upper byte and the lower byte in the access unit of 16 bits of the bus master 100.

In such a configuration, by an upper byte control signal 30a and a lower byte control signal 30b outputted from the bus master 100 respectively, the control register 5 of 8-bit width allocated to the upper byte and the control register 5 of 8-bit width allocated to the lower byte can be accessed at the same time, or only either of them can be accessed.

In addition, explanation on the following embodiments will be made only on the parts different from those in the aforementioned first embodiment.

1 bit among the reception interrupt factor vector 20 given from the interrupt vector register 8 to the reception interrupt factor vector decoder 21, is given directly to a decoder output select circuit 23b as a vector upper/lower select signal 31 in order to indicate which of the control registers 5, upper or lower within access unit of 16 bits of the bus master 100 is selected.

Figure 4:
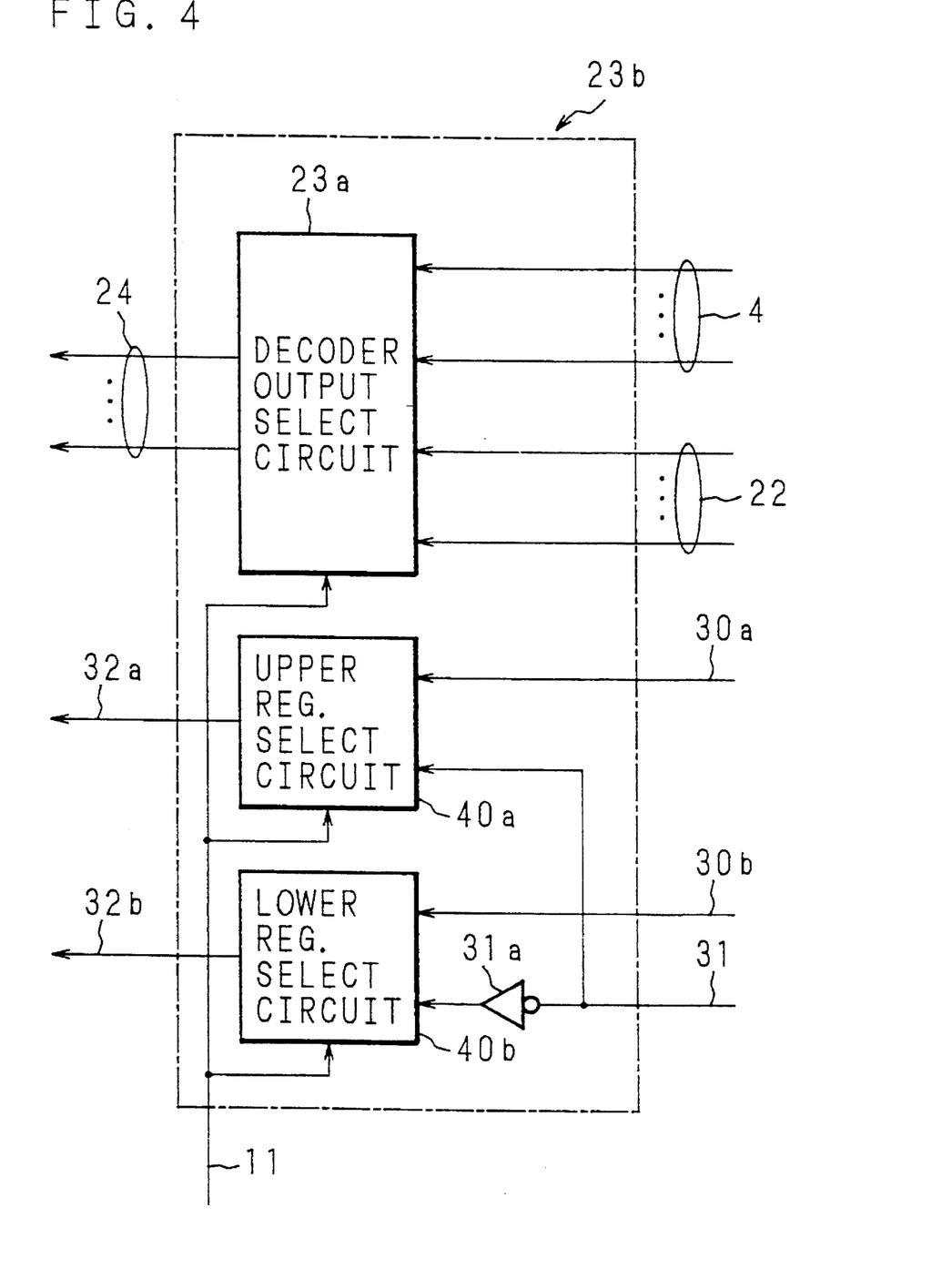
FIG. 4 is a block diagram showing a configuration example of essential parts of the another embodiment of an interrupt controller of a data processor of the invention.

FIG. 4 is a block diagram showing a concrete configuration example of the decoder output select circuit 23b of the second embodiment.

In FIG. 4, character 23a designates a decoder output select circuit having basically the same configuration as that of the decoder output select circuit 23 of the first embodiment shown in the aforementioned FIG. 2. In this second embodiment, the address decode signal 4 outputted from the master address decoder 3 specifies one control register 5 of the upper and the lower respectively, and by the upper and lower byte control signals 30a and 30b outputted from the bus master 100, both of the upper and lower control circuits are, or either of them is to be specified.

Therefore, the number of the address decode signals 4 and the reception interrupt factor processing vector decode signals 22, both being input signals to the decoder output select circuit 23a, are k/2 respectively. The fact that the interrupt vector register read signal 11 which is an output signal of the AND gate 110 is inputted to the decoder output select circuit 23a is same as in the first embodiment. The number of the multi function register select signals outputted from the decoder output select circuit 23a is also k/2.

The decoder output select circuit 23b is further provided with an upper register select circuit 40a, a lower register select circuit 40b, and with an inverter 31a.

The aforementioned upper/lower select signal 31 is inputted to the lower register select circuit 40b through the inverter 31a as well as to the upper register select circuit 40a directly. To the upper register select circuit 40a, the upper byte control signal 30a outputted from the bus master 100 and the interrupt vector register read signal 11 outputted from the AND gate 110 are further inputted, and to the lower register select circuit 40b, the lower byte control signal 30b outputted from the bus master 100 and the interrupt vector register read signal 11 are further inputted, respectively.

Accordingly, the upper register select circuit 40a outputs the upper register select signal 32a when either the upper byte control signal 30a given from the bus master 100 or the vector upper/lower select signal 31 is in assertion state. The lower register select circuit 40b outputs the upper register select signal 32a when either the lower byte control signal 30b given from the bus master 100 or the vector upper/lower select signal 31 is in assertion state.

In each interrupt factor processing unit 1, an AND gate 15 of 2-input is provided. Corresponding to the respective interrupt factor processing units 1-1 to 1-k, the respective AND gates are designated by characters 15-1 to 15-k.

The upper register select signal 32a is given to the respective AND gates 15 of the k/2 number of control registers 5 allocated to the upper byte of the master address 2, and the lower register select signal 32b is given to the respective AND gate 15 of the other k/2 number of control registers 5 allocated to the lower byte of the master address 2. To the other input of each AND gate 15, the multi function register select signal 24 outputted from the decoder output select circuit 23b is given.

Each output of the AND gate 15 is given to each control register 5. When both the upper register select signal 32a and the multi function register select signal 24 are in assertion state, the control registers 5 allocated to the upper byte are connected to the data bus 13, and when both the lower register select signal 32b and the multi function register select signal 24 are in assertion state, the control registers 5 allocated to the lower byte are connected to the data bus 13.

In addition, in the aforementioned first embodiment, to the AND gate 14 of each interrupt factor processing unit 1, the output signal of the AND gate 110 and each multi function register select signal 24 are given. In the second embodiment, however, to the AND gate 14 of each interrupt factor processing unit 1, the output signal of the AND gate 110 and the output signal of each AND gate 15 are given.

In the second embodiment, however, since the number of the multi function register select signal 24 is k/2 as aforementioned, in comparison with the fact that the k-number of the control registers 5 are provided, each signal line of the multi function register select signal 24 is given to two control registers 5 in which one is allocated to the upper and the other is allocated to the lower. In other words, the two control registers 5 connected to the same signal line of the multi function register select, signal 24 can be selected at the same time.

The remaining bits of the aforementioned reception interrupt factor vector 20 are decoded by the reception interrupt factor vector decoder 21.

Such an second embodiment is operated in the same way as the first embodiment even when a plurality of control registers are included in 1 word by utilizing the byte control signals 31a and 30b. That is, in the read/write operation of the control register 5 by the bus master 100, the bus master 100 makes either the upper byte control signal 30a or the lower byte control signal 30b, or both of them be active so as to output the master address 2. By the fact that the upper byte control signal 30a or the lower byte control signal 30b is, or both of them are made to be active, either the upper register select signal 32a or the lower register select signal 32b outputted from the decoder output select circuit 23b is, or both of them are asserted.

At this time, since the fact that the output signal of the AND gate 16 is in assertion state and the output signal of the AND gate 110 is in negation state is same as in the first embodiment, the output signal of one or two AND gates 15, to which the asserted upper byte control signal 30a or the lower byte control signal 30b and the asserted signal among the multi function register select signals 24 are inputted, is asserted, thereby the read/write operation for the control register 5 is possible.

In clearing each interrupt latch 6, by that 1 bit of the vector latched in the interrupt vector register 8 is given to the decoder output select circuit 23b as the vector upper/lower select signal 31, either the upper register select signal 32a or the lower register select signal 32b outputted from the decoder output select circuit 23b is, or both of them are asserted. And the remaining bits of the vector latched in the interrupt vector register 8 are decoded by the reception interrupt factor vector decoder 21 so as to be outputted from the decoder output select circuit 23b as the multi function register select signal 24.

At this time, since the fact that the output signal of the AND gate 16 is in negation state and the output signal of the AND gate 110 is in assertion state is same as in the First embodiment, the output signal of one or two AND gates 15, to which the asserted upper register select signal 32a or the lower register select signal 32b and the asserted signal among the multi function register select signals 24 are inputted, is asserted and the control register 5 is cleared.

As aforementioned, in the second embodiment, even when a plurality of control registers are included in 1 word, the same effect as that in the first embodiment can be obtained, and by utilizing the byte control signals 30a and 30b, the number of the multi function register select signals 24 can be made ½.

Third Embodiment

In addition, in the aforementioned second embodiment, in the case where two of the control registers 5 are specified, when they are in a relationship crossing the word boundary, there is a possibility that the combination of the control registers 5 which the bus master 100 can access at the same time, might not be in coincidence with the combination of the control registers 5 specified by the reception interrupt factor processing vector decode signal 22, resulting in various inconvenience. As a counter measure to such a case, a configuration shown in the block diagram of FIG. 5 is considered.

Figure 5:
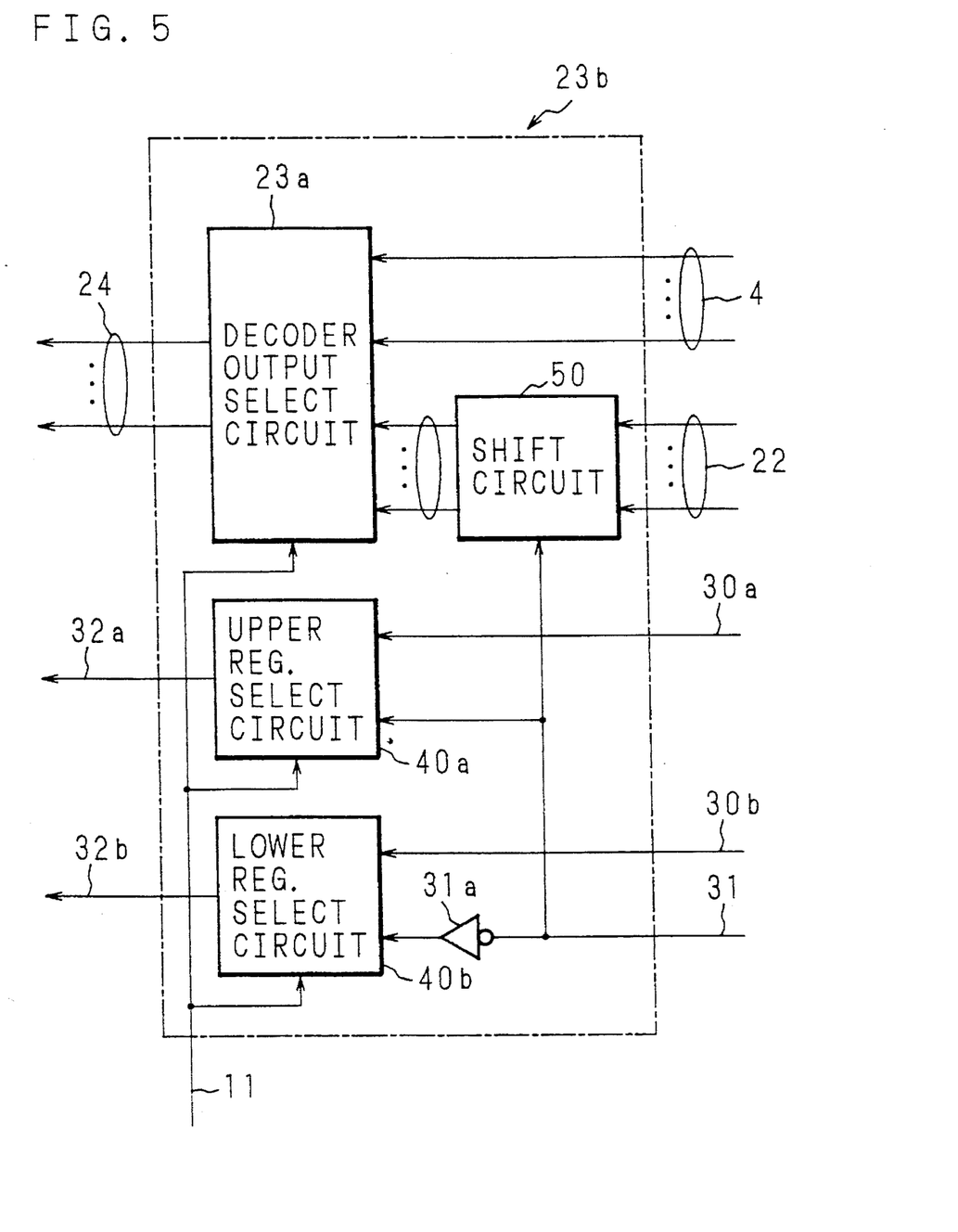
FIG. 5 is a block diagram showing a configuration example of still another embodiment of an interrupt controller of a data processor of the invention.

In the configuration shown in FIG. 5, a shift circuit 50 which shifts the reception interrupt Factor processing vector decode signal 22 by 1 bit, is added to the configuration of FIG. 4 of the aforementioned second embodiment. The shift circuit 50 is controlled by the vector upper/lower select signal 31 and shifts the reception interrupt factor processing vector decode signal 22 by 1 bit, thereby, adjusting the uncoincidence between the aforementioned combination of the control registers 5 which the bus master 100 can access at the same time and the combination of the control registers 5 specified by the reception interrupt factor processing vector decode signal 22.

As aforementioned, by adopting a configuration shown in FIG. 5, in the third embodiment, even when the combination of the control registers 5 specified by the reception interrupt factor processing vector decode signal 22 is in the relationship crossing the word boundary, the same effect as the second embodiment can be obtained by providing the shift circuit 50.

As aforementioned, according to the invention, by using the decode result of a vector as a register select signal, the received interrupt factor can clear the interrupt factor latch by specifying it directly. Therefore, even when the number of interrupt factors increases, the increase of the delay time of a signal for clearing the interrupt request latch which has received an interrupt request can be suppressed without increasing the area of the control signal lines so much.

As this invention may be embodied in several forms without, departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. Data processor, comprising:

a bus master for executing an interrupt processing in accordance with a corresponding interrupt vector when an interrupt request is given from an external source;

a group of registers consisting of a plurality of registers specified by a master address outputted from said bus master, and including a plurality of first kind of registers which latch respectively a plurality of interrupt requests and to which unique interrupt vectors are allocated corresponding to them respectively and other second kind of registers;

a data bus connecting said bus master and each register of said group of registers;

first decoding means for decoding a master address outputted from said bus master so as to output a decode signal which specifies one or other register of said group of registers;

an interrupt vector register for latching, when an interrupt request is latched by one or a plurality of said plurality of first kind of registers, an interrupt vector corresponding to one of them;

second decoding means for outputting a decode signal which specifies, by decoding an interrupt vector latched by said interrupt vector register, the first kind of register corresponding to the interrupt vector;

a decoder output select circuit for selecting the decode output of said second decoding means when said bus master reads an interrupt vector latched by said interrupt vector register so as to execute an interrupt processing, and for selecting the decode output of said first decoding means when said bus master accesses first kind or second kind of register of said group of registers; and clearing means for clearing the first kind of register specified by the decode output of said decoder output select circuit, when said bas master reads an interrupt vector latched by said interrupt vector register so as to execute an interrupt processing.

2. A data processor, as set forth in claim 1, wherein said register group is so divided into two groups that two registers are simultaneously specified by said master address, and one of said two registers is specified by a first signal outputted from said bus master and the other is specified by a second signal outputted from said bus master, and said first decoding means comprises means for generating said first and second signals responsive to a value of one bit among the interrupt vector latched by said interrupt vector register.

3. A data processor as set forth in claim 2, wherein said first decoding means further comprises shift means for shifting said master address responsive to the value of said one bit among the interrupt vector latched by said interrupt vector register.

* * * * *